US008655363B2

(12) United States Patent
Tomizu (10) Patent No.: US 8,655,363 B2
(45) Date of Patent: Feb. 18, 2014

(54) WIRELESS COMMUNICATION TERMINAL REQUESTING CONTENT OF BROADCAST/MULTICAST TO HANDOFF DESTINATION BASE STATION

(75) Inventor: Makoto Tomizu, Yokohama (JP)

(73) Assignee: Kyocera Corporation, Kyoto (JP)

( * ) Notice: Subject to any disclaimer, the term of this patent is extended or adjusted under 35 U.S.C. 154(b) by 408 days.

(21) Appl. No.: 11/444,900

(22) Filed: May 31, 2006

(65) Prior Publication Data

US 2007/0140173 A1  Jun. 21, 2007

(30) Foreign Application Priority Data

May 31, 2005  (JP) ................. P2005-159600

(51) Int. Cl.
*H04W 36/00* (2009.01)
*H04W 40/00* (2009.01)
*H04W 4/00* (2009.01)

(52) U.S. Cl.
USPC ........... 455/436; 455/437; 455/438; 455/439; 455/440; 455/442; 455/445; 455/518; 370/331

(58) Field of Classification Search
USPC ............... 370/331, 328; 455/524, 422.1, 422, 455/436–445, 518
See application file for complete search history.

(56) References Cited

U.S. PATENT DOCUMENTS

| | | | | |
|---|---|---|---|---|
| 6,473,411 | B1 * | 10/2002 | Kumaki et al. | ............... 370/331 |
| 7,336,952 | B2 * | 2/2008 | Leung | ........................... 455/437 |
| 2003/0100325 | A1 * | 5/2003 | Paila et al. | .................... 455/436 |
| 2003/0119452 | A1 * | 6/2003 | Kim et al. | ....................... 455/69 |
| 2003/0134622 | A1 | 7/2003 | Hsu et al. | |
| 2004/0085926 | A1 * | 5/2004 | Hwang et al. | ................. 370/328 |
| 2004/0202140 | A1 | 10/2004 | Kim et al. | |
| 2004/0203816 | A1 * | 10/2004 | Bae et al. | ....................... 455/450 |
| 2004/0228360 | A1 | 11/2004 | Bae et al. | |
| 2005/0013268 | A1 * | 1/2005 | Chang et al. | .................. 370/328 |
| 2005/0068963 | A1 * | 3/2005 | Lee et al. | ..................... 370/395.3 |
| 2005/0073990 | A1 * | 4/2005 | Chang et al. | .................. 370/349 |
| 2005/0079867 | A1 | 4/2005 | Balachandran et al. | |
| 2005/0094618 | A1 * | 5/2005 | Colban et al. | ................. 370/350 |
| 2005/0111393 | A1 | 5/2005 | Jeong et al. | |
| 2005/0170842 | A1 * | 8/2005 | Chen | ............................. 455/454 |
| 2005/0282571 | A1 * | 12/2005 | Oprescu-Surcobe et al. | 455/503 |
| 2006/0262751 | A1 | 11/2006 | Vermola et al. | |

FOREIGN PATENT DOCUMENTS

| | | |
|---|---|---|
| EP | 1392075 A1 * | 2/2004 |
| JP | 2003-189346 | 7/2003 |
| JP | 2004-312750 | 11/2004 |
| JP | 2005-117649 | 4/2005 |

(Continued)

OTHER PUBLICATIONS

Chinese language office action dated Apr. 4, 2008 and its English language translation issued in corresponding Chinese application 200610087684.9.

(Continued)

*Primary Examiner* — Olumide T Ajibade Akonai
(74) *Attorney, Agent, or Firm* — DLA Piper LLP (US)

(57) ABSTRACT

A wireless communication terminal, comprises: a requesting section that is configured to request content of a broadcast/multicast service; a storage section that is configured to store information on the content requested by the requesting section; and a control section that, when a handoff is performed, is configured to control a handoff destination base station in order to request the content stored in the storage section based on the information on the content.

2 Claims, 5 Drawing Sheets

(56) References Cited

FOREIGN PATENT DOCUMENTS

| JP | 2005-117655 | 4/2005 |
|----|----|----|
| WO | 03-063418 | 7/2003 |
| WO | 2004-102966 | 11/2004 |
| WO | 2005034396 A1 | 4/2005 |

OTHER PUBLICATIONS

Japanese language office action (decision of rejection) dated Apr. 5, 2011 and its English language translation for corresponding Japanese application 2007018096.

* cited by examiner

WIRELESS COMMUNICATION TERMINAL REQUESTING CONTENT OF BROADCAST/MULTICAST TO HANDOFF DESTINATION BASE STATION

BACKGROUND OF THE INVENTION

1. Field of the Invention

The present invention relates to a wireless communication terminal used in a wireless communication system that supports broadcast/multicast services.

Priority is claimed on Japanese Patent Application No. 2005-159600, filed May 31, 2005, the content of which is incorporated herein by reference.

2. Description of the Related Art

In wireless communication in which wireless communication terminals move freely within an area in which the wireless communication is provided, a technique called "handoff" is used to maintain the communication when a wireless communication terminal goes out of an area covered by one wireless base station and moves to an area of an adjacent different wireless base station or another sector. One method for achieving such a handoff is a method in which a signal for measurement is sent by respective wireless base stations with certain radio field intensity for measurement of the radio field intensity and a wireless communication terminal receives the signals and switches to another wireless base station. This method is an important technique for maintaining a communication channel since the status of reception of the wireless channel is maintained in a certain condition. For example, details of handoffs in accordance with the IS95 scheme are described in many documents, such as Japanese Unexamined Patent Application, First Publication No. 2003-189346.

On the other hand, from the viewpoint of effective utilization of wireless channels, a new service for wireless communication called Broadcast Multicast Service (BCMCS) has been proposed. This service is one type of broadcast service in which a plurality of wireless communication apparatuses simultaneously share a single communication channel called a "broadcast channel" for receiving information by the plurality of wireless communication apparatuses from the one channel providing a service of a broadcast type (i.e., a broadcast service). The service enables each wireless base station to broadcast common information to wireless communication terminals within their respective areas. Furthermore, since a respective channel is not required to be established by each wireless communication terminal, it becomes possible to distribute a large volume of data, such as news or movies, thereby improving utilization of the wireless channel. Furthermore, since it is possible to control each base station, unlike in a general wide-area broadcast service, distribution of information that is more closely related to the local area is made possible.

The procedure for information distribution of BCMCS will be described briefly. A wireless base station sends notification information relating to services that the wireless base station can offer to all wireless communication terminals within its wireless area. A wireless communication terminal receives the information and starts to receive a service it desires to receive by registering identification information that specifies the service with the wireless base station. The wireless base station receives the registering information from the wireless communication terminal and starts to provide the service if the service desired by the wireless communication terminal is not being provided at present (the information content is not being provided). The BCMCS stops provision of information content when no user is using the service from the viewpoint of effective utilization of wireless resources, and frees the communication channel used for the BCMCS so that the channel can be used as a general channel.

However, this method has the shortcoming that when a wireless communication apparatus using the BCMCS moves within the communication area of the wireless base station and hands off to another wireless area (for example, a cell or a sector). With the conventional wireless communication technologies, it is possible to maintain the wireless communication channel. However, the wireless base station to which a wireless communication terminal is currently connected and is providing the service does not notify whether or not the broadcast service is currently being provided. The statuses of services provided by a handoff destination base station, such what types of service is being provided, are unknown. As a result, the service provided through the BCMCS cannot be maintained.

SUMMARY OF THE INVENTION

The present invention was conceived given the above-described background, and an object thereof is to provide a wireless communication terminal which can continue provision of a service without causing an interruption of the service when a handoff occurs.

A first aspect of the present invention is a wireless communication terminal, comprising: a requesting section that is configured to request content of a broadcast/multicast service; a storage section that is configured to store information on the content requested by the requesting section; and a control section that, when a handoff is performed, is configured to control a handoff destination base station in order to request the content stored in the storage section based on the information on the content.

In a second aspect of the present invention, in the above wireless communication terminal, the control section may be configured to control the handoff destination base station in order to obtain content identification information corresponding to the information on the content stored in the storage section and request the content according to the obtained content identification information.

In a third aspect of the present invention, in the above wireless communication terminal, the storage section may be configured to store content identification information on the content obtained from the pre-handoff base station and requested by the requesting section, and the control section may be, when a handoff is performed, configured to control to request the content to handoff destination base station according to the content identification information that is stored in the storage section.

In a fourth aspect of the present invention, in the above wireless communication terminal, the control section, when the content identification information is not available in the handoff destination base station after requesting the content to handoff destination base station according to the content identification information that is stored in the storage section, may be configured to control the handoff destination base station to obtain the identification information corresponding to the information on the content stored in the storage section content from the handoff destination base station and to request the content according to the obtained content identification information.

According to the present invention, it is possible to continue provision of a service without causing an interruption of the service upon the occurrence of a handoff.

DETAILED DESCRIPTION OF THE INVENTION

First Embodiment

Figure 1:
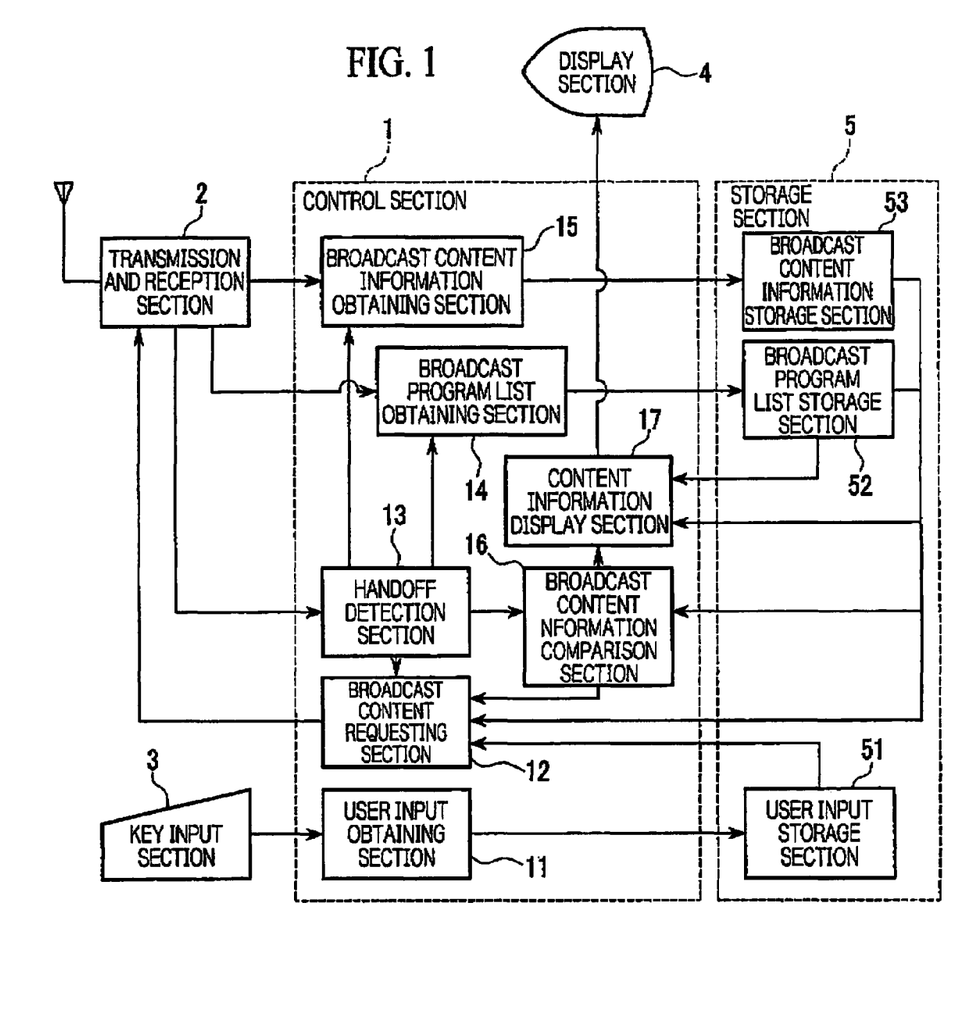
FIG. 1 is a block diagram illustrating a mobile telephone terminal according to an embodiment of the present invention.

Hereinafter, a mobile telephone terminal according to a first embodiment of the present invention will be described with reference to the drawings. FIG. 1 is a block diagram showing a configuration of an embodiment of the present invention. In FIG. 1, reference numeral 1 denotes a control section that exercises control over operations of the wireless communication terminal. Reference numeral 2 denotes a transmission and reception section that establishes wireless communication with a wireless base station for sending and receiving information. Reference numeral 3 denotes a key input section made up of various keys including a dial key, function keys, and so on. Reference numeral 4 denotes a display section made up of a liquid crystal display or the like. Reference numeral 5 denotes a storage section that stores information received via to transmission and reception section 2 and information input via the key input section 3.

Reference numeral 11 denotes a user input obtaining section that reads information input by the user through operation of the key input section 3. Reference numeral 12 denotes broadcast content requesting section that sends identification information that identifies content to the wireless base station via the transmission and reception section 2 for requesting a distribution of broadcast content (a stream, a flow, or the like). Reference numeral 13 denotes a handoff detection section that detects whether or not a handoff that is to be performed has occurred based on signals for measuring the radio field intensity received by the transmission and reception section 2. Reference numeral 14 denotes a broadcast program list obtaining section that receives via the transmission and reception section 2 broadcast program information including identification information that identifies content broadcasted by the wireless base station. Reference numeral 15 denotes broadcast content information obtaining section that receives via the transmission and reception section 2 broadcast content broadcasted by the wireless base station. Reference numeral 16 denotes broadcast content information comparison section that compares broadcast content that was received before a handoff with broadcast content that is received after the handoff to determine whether or not they are the same broadcast content. Reference numeral 17 denotes content information display section that displays information on the received broadcast content and the broadcast program list on the display section 4.

Reference numeral 51 denotes a user input storage section that stores the user input information read by the user input section obtaining section 11. Reference numeral 52 denotes a broadcast program list storage section that stores information on the broadcast program list obtained by the broadcast program list obtaining section 14. Reference numeral 53 denotes broadcast content information storage section that stores the broadcast content obtained by the broadcast content information obtaining section.

Figure 2:
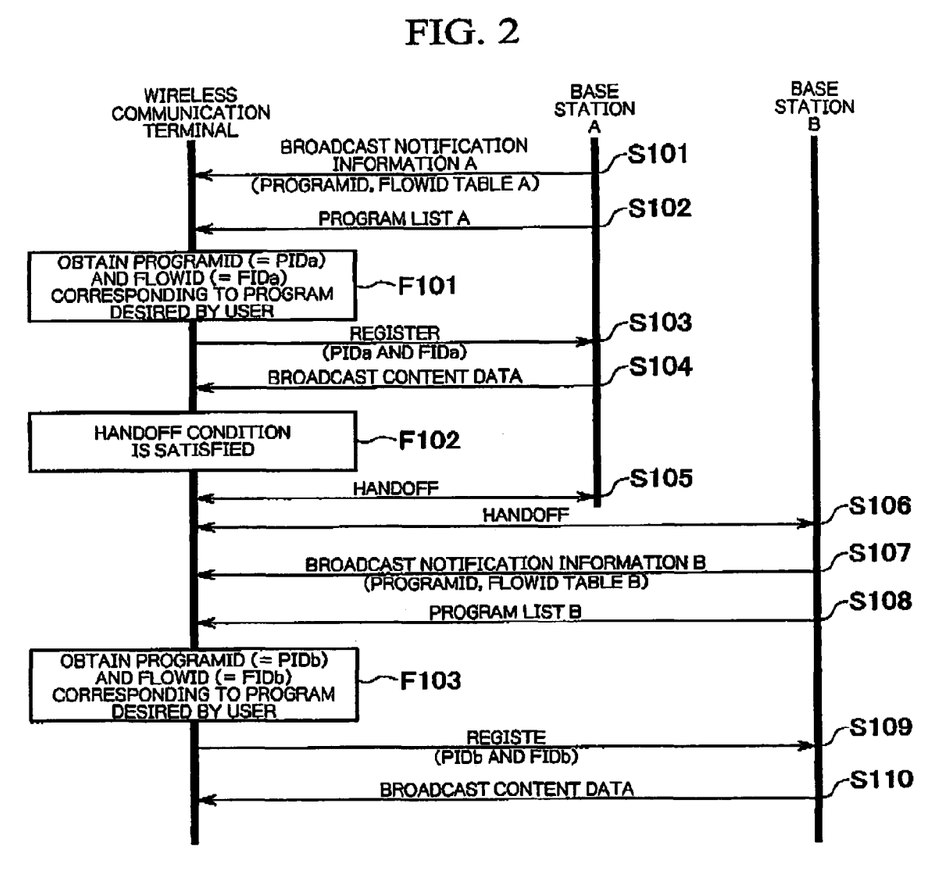
FIG. 2 is a sequence chart illustrating operations of a wireless communication terminal according to a first embodiment of the present invention.

Next, with reference to FIG. 2, operation of the wireless communication terminal shown in FIG. 1 for receiving broadcast content will be described. Here, by way of example, operations of the wireless communication terminal when a handoff occurs from a wireless base station A to a wireless base station B will be described. First, the wireless base station A sends broadcast notification information A (broadcast overhead message) and program list information A to its communication area (steps S101 and S102). The broadcast notification information A includes information related to a "ProgamID" that can be used to uniquely identify content, and a "FlowID" that specifies an attribute (data rate, screen size, sound quality, codec type, or the like) of the content. Furthermore, the program list information A includes information on a broadcast start time for each content to be broadcasted.

The broadcast program list obtaining section 14 receives the broadcast notification information A and the program list information A sent by the wireless base station A via the transmission and reception section 2, and stores the broadcast notification information A and the program list information A that have been received in the broadcast program list storage section 52. The content information display section 17 reads the program list information A stored in the broadcast program list storage section 52 and displays it on the display section 4. By the above-described operation, a broadcast program list containing a broadcast start time for each of content broadcasted by to wireless base station A is displayed on the display section 4. In the broadcast program list, each content is listed with the content name thereof so that the user can select desired content. The user operates the key input section 3 while looking at the broadcast program list displayed on the display section 4 to select and specify the desired content. The user input obtaining section 11 reads the inputs made via the key input section 3, and stores the content selected by the user in the user input section storage section 51 as content information.

Next, the broadcast content requesting section 12 reads the content information stored in the user input storage section 51, looks up the program list information A stored in the broadcast program list storage section 52, and identifies the content selected by the user. The broadcast content requesting section 12 then looks up the broadcast notification information A stored in the broadcast program list storage section 52, and obtains the ProgramID (hereinafter, referred to as "PIDa") of the identified content. Furthermore, the broadcast content requesting section 12 reads a terminal attribute (data rate, screen size, sound quality, codec type, or the like) unique to the wireless communication terminal stored in the wireless communication terminal in advance, and selects a content attribute that matches the terminal attribute, and obtaining the FlowID (hereinafter, referred to as "FIDa") for identifying the selected content attribute (F101). It should be noted that the obtained PID and FID are stored in the storage section 5.

Next, the broadcast content requesting section 12 sends a content broadcast request (BCMCS flow registration message) including the PIDa and FIDa that were obtained to the wireless base station A, and registers the PIDa and FIDa of the desired content with the wireless base station A (step S103). Once the wireless base station A receives this content broadcast request, it determines whether or not a broadcast of the requested content has already been executed. If not, the wireless base station A starts broadcasting the content specified by the PIDa and the FIDa contained in the broadcast request. In contrast, if broadcast of the content has already been executed, the wireless base station A continues to broadcast the content.

The broadcast content information obtaining section 15 receives the broadcast content data broadcasted by the wireless base station A via the transmission and reception section 2, and stores the received broadcast content data in the broadcast content information storage section 53 (step S104). The content information display section 17 sequentially reads the broadcast content information stored in the content broadcast storage section 53 and displays it on the display section 4. As a result, a broadcast of the content that is desired by the user is executed, and content, such as a movie, for example, is consequently displayed on the display section 4.

When the wireless communication terminal moves within a communication area and a handoff condition is satisfied (F102) while it is receiving the broadcast content data broadcasted from the wireless base station A, the wireless communication terminal performs an operation for performing handoff from the wireless base station A to the wireless base station B (steps S105 and S106). When the handoff detection section 13 detects this handoff operation, it instructs the broadcast program list obtaining section 14 to obtain a new broadcast program list. At that time, the wireless base station B sends a broadcast notification information B and program list information B within the communication area thereof (steps S107 and S108). When the broadcast program list obtaining section 14 receives the instruction requesting obtainment of a new broadcast program list from the handoff detection section 13, it receives the broadcast notification information B and the program list information B sent from the wireless base station B via the transmission and reception section 2 and stores the broadcast notification information B and the program list information B that are received in the broadcast program list the storage section 52. In this way, a broadcast program list that contains broadcast start times for each content broadcasted from the wireless base station B is made known. Next, the broadcast content requesting section 12 reads the content information that was selected before the handoff and is stored in the user input storage section 51, looks up the program list information B stored in the broadcast program list storage section 52, and identifies the content that was stored. The broadcast content requesting section 12 then looks up the broadcast notification information B stored in the broadcast program list storage section 52, and obtains the ProgramID (hereinafter, referred to as "PIDb") of the identified content. Furthermore, the broadcast content requesting section 12 reads a terminal attribute (data rate, screen size, sound quality, codes type, or the like) unique to the wireless communication terminal stored in the wireless communication terminal in advance, and selects a content attribute that matches the terminal attribute, and obtains the FlowID referred to as "FIDb") for identifying the selected content attribute (F103).

Next, the broadcast content requesting section 12 sends a content broadcast request (BCMCS flow registration message) including the PIDb and FIDb that were obtained to the wireless base station B, and registers the PIDb and FIDb for the desired content with the wireless base station B (step S109). It should be noted that the obtained PID and FID are stored in the storage section 5. Once the wireless base station B receives this content broadcast request, it determines whether or not a broadcast of the requested content has already been executed. If not, the wireless base station B starts broadcasting the content specified by the PIDb and the FIDb contained in the broadcast request. In contrast, if broadcast of the content has already been executed, the wireless base station A continues to broadcast the content.

The broadcast content information obtaining section 15 receives the broadcast content data broadcasted by the wireless base station B via the transmission and reception section 2, and stores the received broadcast content data in the broadcast content information storage section 53 (step S110). The content information display section 17 sequentially reads the broadcast content information stored in the content broadcast storage section 53 and displays it on the display section 4. As a result, the content that is desired by the user is downloaded from the handoff destination wireless base station B, and content, such as a movie, for example, is consequently displayed on the display section 4.

In the above-described embodiment, it becomes possible to obtain, upon handoff, a program list information of a list of content being provided from the handoff destination wireless base station in order to register with the handoff destination wireless base station the same content as the content that was received before the handoff. Therefore, it is possible to automatically receive the same content data from the handoff destination base station, thereby preventing difficulty in receiving the content data that was received before the handoff due to the occurrence of the handoff.

Second Embodiment

Next, a wireless communication terminal according to second embodiment will be described with reference to FIG. 3. The second embodiment is an improved version of the wireless communication terminal according to the first embodiment of the present invention. A detailed description of the configuration of the wireless communication terminal according to the second embodiment of the present invention will be omitted since it is similar to the configuration shown in FIG. 1. The wireless communication terminal according to the second embodiment of the present invention is different from the wireless communication terminal of the first embodiment in that, in the second embodiment, when a handoff occurs, broadcast notification information and program list information is registered with a handoff destination wireless base station before receiving them by the handoff destination wireless base station using identification information of a contents (PID and FID) that have been identified and stored before the handoff.

The operation for broadcast to the wireless communication terminal broadcast content data will be described with reference to the schematic diagram shown in FIG. 3. The broadcasted content provided by a broadcast is stored in content server after identification information is provided for each content. In the example shown in FIG. 3, content data having identification information C1 to C4 provided thereto is stored. The content server, and the wireless base stations A-1, A-2, and B are each provided with controllers A and B that retain broadcast notification information and program list information and control distribution by means of broadcasting of content data stored in the content server. The controller A is connected to the wireless base station A-1 and the wireless base station A-2, and content data is provided by means of broadcasting to wireless communication terminals within their respective communication areas. The controller B is connected to the wireless base station B, and content data is provided by means of broadcasting to wireless communication terminals within the respective communication area thereof.

Figure 3:
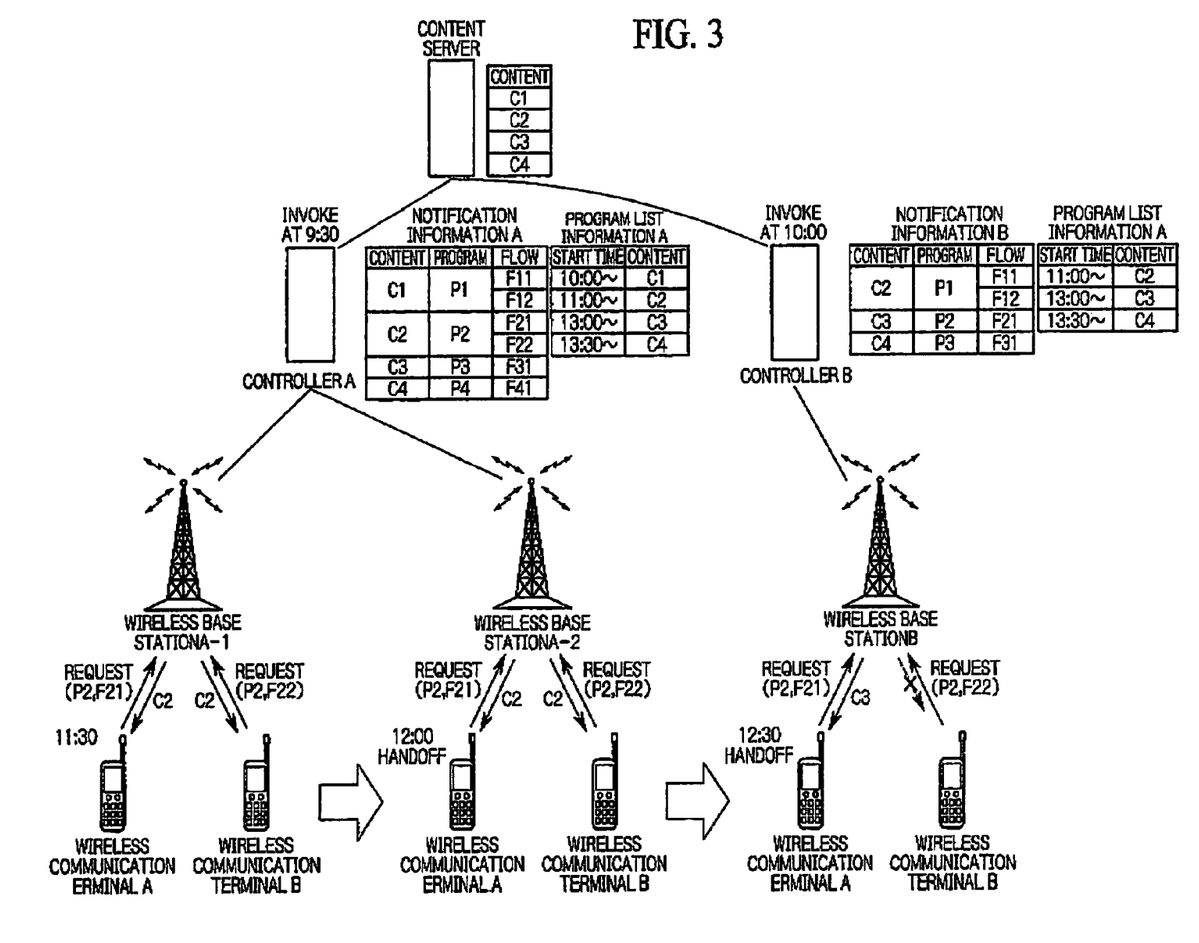
FIG. 3 is a schematic diagram illustrating operations of a wireless communication terminal according to a second embodiment of the present invention.

In the configuration shown in FIG. 3, the wireless communication terminal A and the wireless communication terminal B receive notification information A and the program list information A from the wireless base station A-1, and request to the wireless base station A-1 a broadcast of Program P2 (Content C2) at 11:30. At that time, supposing that the wireless communication terminal A has a PID (program ID) of "P2" and an FID (flow ID) of "F21" and the wireless communication terminal B has a PID of "P2" and an FID of "F22," the wireless communication terminals A and B can receive Content C2 that corresponds to Program P2 from the wireless base station A-1.

When, at 12:00 while reception is occurring, the handoff condition is satisfied in the two wireless communication terminals A and B and an operation is executed for performing handoff from the wireless base station A-1 to the wireless base station A-2, the two wireless communication terminals A and B again request a broadcast of Program P2 to the wireless base station A-2 using the pre-handoff PID and the FID. In this case, since the wireless base station A-1 and the wireless base station A-2 are broadcasting content data according to the instructions from the same controller A, it is made possible to receive the same content as the pre-handoff wireless base station A-1.

In the second embodiment, upon the occurrence of a handoff, before receiving broadcast notification information and program list information in the handoff destination base station, the pre-handoff base station is registered with the handoff destination wireless base station using identification information (a PID and an FID) of the content that has obtained before the handoff. Therefore, it is possible to start receiving the content data before the program list information of the handoff destination base station is obtained, thereby shorting the time during which the content data that was received before the handoff cannot be received due to the occurrence of the handoff compared to in the first embodiment.

Third Embodiment

Figure 4:
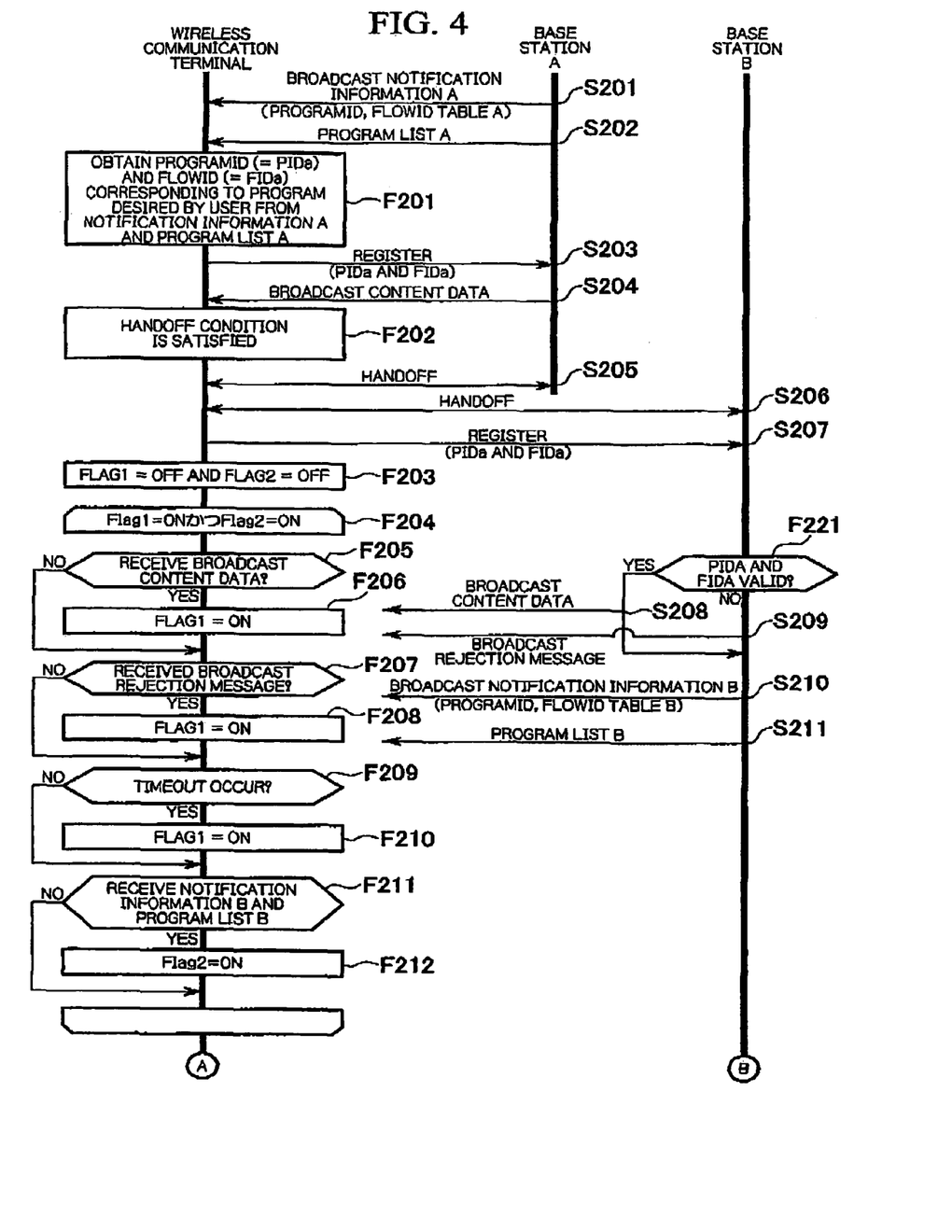
FIG. 4 is a sequence chart illustrating operations of a wireless communication terminal according to a third embodiment of the present invention.

Next, a wireless communication terminal according to third embodiment will be described with reference to FIGS. 3 to 5. The third embodiment is an improved version of the wireless communication terminal according to the second embodiment of the present invention. A detailed description of the configuration of the wireless communication terminal according to the third embodiment of the present invention will be omitted since it is similar to the configuration shown in FIG. 1. The wireless communication terminal according to the third embodiment of the present invention is different from the wireless communication terminal of the second embodiment in that, in the third embodiment, operation performed after the registration with the handoff destination wireless base station is performed using content identification information (a PID and an FID) that is identified before the handoff. This is especially useful in a system in which the forms of broadcast in service areas are different between before and after a handoff.

For example, in shown in FIG. 3, when a handoff condition is satisfied in the two wireless communication terminals A and B at 12:30 and a handoff is performed from the wireless base station A-2 to the wireless base station B while the two wireless communication terminals A and B are receiving broadcasted content data from the wireless base station A-2, the two wireless communication terminals A and B request the wireless base station B to broadcast Program P2 to using the pre-handoff PID and the FID. In this case, although the wireless communication terminal A is supposed to receive Content C3, and since the wireless communication terminal has no corresponding content, wireless communication terminal A cannot receive the content. This happens due to difference in the forms of broadcast in the service areas before and after the handoff, and the third embodiment can identify this situation properly and handle it.

Operation for receiving a broadcast service before handoff will be described with reference to FIG. 4.

First, the wireless base station A sends broadcast notification information A and program list information A to its communication area (steps S201 and S202). The broadcast notification information A includes information related to a "ProgramID" that can be used to uniquely identify content, and a "FlowID" that specifies an attribute (data rate, screen size, sound quality, codec type, or the like) of the content. Furthermore, the program list information A includes information on a broadcast start time for each content to be broadcasted.

The broadcast program list obtaining section 14 receives the broadcast notification information A and the program list information A sent by the wireless base station A via the transmission and reception section 2, and stores the broadcast notification information A and the program list information A that have been received in the broadcast program list storage section 52. The content information display section 17 reads the program list information A stored in the broadcast program list storage section 52 and displays it on the display section 4. By the above-described operation, a broadcast program list containing a broadcast start time for each of content broadcasted by the wireless base station A is displayed on the display section 4. In the broadcast program list, each content is listed with the content name thereof so that the user can select desired content. The user operates the key input section 3 while looking at the broadcast program list displayed on the display section 4 to select and specify the desired content. The user input obtaining section 11 reads the inputs made via the key input section 3, and stores the content selected by the user in the user input section storage section 51 as content information.

Next, the broadcast content requesting section 12 reads the content information stored in the user input storage section 51, looks up the program list information A stored in the broadcast program list storage section 52, and identifies the content selected by the user. The broadcast content requesting section 12 then looks up the broadcast notification information A stored in the broadcast program list storage section 52, and obtains the ProgramID (hereinafter referred to as "PIDa") of the identified content. Furthermore, the broadcast content requesting section 12 reads a terminal attribute (data rate, screen size, sound quality, codec type, or the like) unique to the wireless communication terminal stored in the wireless communication terminal in advance, and selects a content attribute that matches the terminal attribute, obtains the FlowID (hereinafter, referred to as "FIDa") for identifying the selected content attribute (F201), and retains the PIDa the FIDa within the broadcast content requesting section 12.

Next, the broadcast content requesting section 12 sends a content broadcast request including the PIDa and FIDa that were obtained to the wireless base station A, and registers the PIDa and FIDa of the desired content with the wireless base station A (step S203). Once the wireless base station A receives this content broadcast request, it determines whether or not a broadcast of the requested content has already been executed. If not, the wireless base station A starts broadcasting the content specified by the PIDa and the FIDa contained in the broadcast request. In contrast, if a broadcast of the content has already been executed, the wireless base station A continues to broadcast the content.

The broadcast content information obtaining section 15 receives the broadcast content data broadcasted by the wireless base station A via the transmission and reception section 2, and stores the received broadcast content data in broadcast content information the storage section 53 (step S204). The content information display section 17 sequentially reads the broadcast content information stored in the content broadcast storage section 53 and displays it on the display section 4. As a result, a download of the content that is desired by the user is executed, and content, such as a movie, for example, is consequently displayed on the display section 4.

When the wireless communication terminal moves within a communication area and a handoff condition is satisfied (F202) while it is receiving the broadcast content data broadcasted from the wireless base station A, the wireless communication terminal performs an operation for performing handoff from the wireless base station A to the wireless base station B (steps S205 and S206). When the handoff detection section 13 detects this handoff operation, it instructs the broadcast content obtaining section 12 to send a content broadcast request. The broadcast content requesting section 12 sends a content broadcast request including PIDa and FIDa that were stored in the broadcast content requesting section 12 to the wireless base station A, and registers the PIDa and FIDa of the desired content with the wireless base station B (step S207).

Next, the broadcast content information comparison section 16 sets its internal flags, Flag1 and Flag2, to OFF (F203), and the loop operation of F204 through F212 is executed until Flag1 and Flag2 are both set to ON. Flag1 is set to ON when broadcast content data is received from the wireless base station B (F205 and F206), or a broadcast rejection message is received from the wireless base station B (F207 and F208), or when or a timeout occurs (F209 and F210). Flag2 is set to ON when the broadcast notification information B and the program list information B are received from the handoff destination wireless base station B (F211 and F212). That is, the broadcast content information comparison section 16 continues the loop operation until (Condition 1) at least one of the following is satisfied: timeout occurs, or broadcast content data is received, and (Condition 2) the broadcast notification information B and the program list information B are received from the handoff destination wireless base station B.

The wireless base station B determines whether or not the PIDa and the FIDa that were registered by the wireless communication terminal are valid (F221). When the PIDa and the FIDa that were registered are valid, the wireless base station B determines whether or not a broadcast of the requested content has already been executed. When the broadcast has not been executed, a broadcast of the content specified by the PIDa and the FIDa contained in the broadcast request is started. When the broadcast has been executed, the broadcast of the content is continued (step S208). On the other hand, if the PIDa and the FIDa that were registered by the wireless communication terminal are invalid, a broadcast rejection message (or broadcast reset message) is sent to the wireless communication terminal (step S209). It should be noted that the broadcast rejection message may be not sent. The wireless base station B then sends the broadcast notification information B and the program list information B within the communication area thereof (steps S210 and S211). The broadcast notification information B includes information related to a "ProgramID" that can be used to uniquely identify content, and a "FlowID" that specifies an attribute (data rate, screen size, sound quality, codec type, or the like) of the content. Furthermore, the program list information B includes information on a broadcast start time for each content to be broadcasted.

Figure 5:
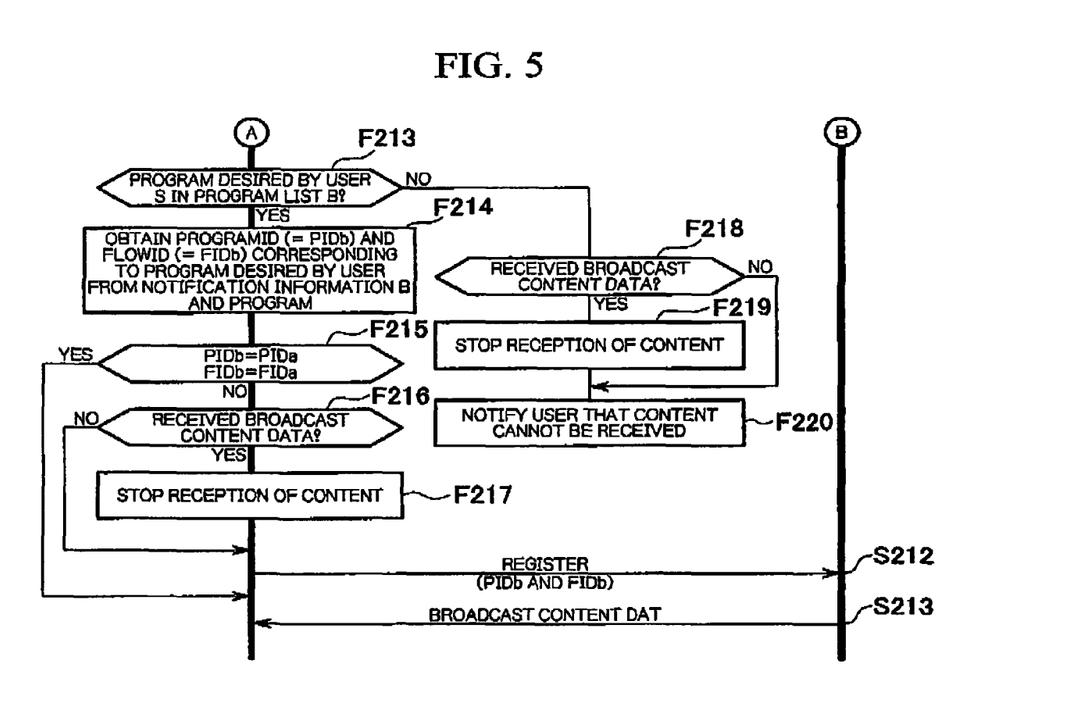
FIG. 5 is a sequence chart illustrating operations of a wireless communication terminal according to the third embodiment of the present invention.

Next, as shown in FIG. 5, after a handoff is executed and content request is made, the broadcast content information comparison section 16 terminates the loop operation that have been executed when the loop termination condition in F204 (Flag1 and Flag2 are both ON) is satisfied. A search is made on the program list information B received from the handoff destination wireless base station (the wireless base station B in this example) and it is determined whether or not a broadcast of a program desired by the user (the same content data that has been received before the handoff) is found in the list (F213). No program desired by the user is found in the search, the broadcast content information obtaining section 15 determines whether or not the broadcast content data is being received (F219), and if so, it stops reception of the broadcast content data (F219). The same content data that was being received before the handoff then displays on the display section 4 a message indicating that the content cannot be received (F220).

In contrast, when the program desired by the user (the same content data as the one has been received before the handoff) is found in the program list information B, the broadcast content information comparison section 16 looks up the program list information B stored in the storage section 52 and obtains a ProgramID of the content that is desired by the user (hereinafter, referred to as "PIDb"). Furthermore, the broadcast information comparison section 16 reads a terminal attribute unique to the wireless communication terminal stored in the wireless communication terminal in advance, and selects a content attribute that matches the terminal attribute, obtains the FlowID (hereinafter, referred to as "FIDb") for identifying the selected content attribute, and stores it in the broadcast information comparison section 16 (F214). The broadcast content information comparison section 16 thereafter compares the PIDa and the FIDa that were obtained before the handoff and the PIDb and the FIDb that were newly obtained to determine whether or not they are same (F215).

Next, when the conditions: PIDa=PIDb and FIDa=FIDb are not satisfied, the broadcast content information comparison section 16 determines whether or not the broadcast content data is being received (F215), and if so, it stops reception of the broadcast content data (F216 and F217). The broadcast content information comparison section 16 instructs the broadcast content requesting section 12 to send a new content request. In response to receiving the instruction, the broadcast content requesting section 12 sends a content broadcast request including the PIDb and the FIDb that were newly obtained to the wireless base station B, and registers a PIDb and an FIDb of the desired content with the wireless base station B (step S212). Once the wireless base station B receives this content broadcast request, it determines whether or not a broadcast of the requested content has already been executed. If not, the wireless base station B starts broadcasting the content specified by the PIDb and the FIDb contained in the broadcast request. In contrast, if broadcast of the content has already been executed, the wireless base station B continues to broadcast the content.

The broadcast content information obtaining section 15 receives the broadcast content data broadcasted by the wireless base station B via the transmission and reception section 2, and stores the received broadcast content data in the broadcast content information storage section 53 (step S213). The content information display section 17 sequentially reads the broadcast content information stored in the content broadcast storage section 53 and displays it on the display section 4. As a result, broadcast of the content that is desired by the user is executed, and content, such as a movie, for example, is consequently displayed on the display section 4.

On the other hand, when the conditions: PIDa=PIDb and FIDa=FIDb are satisfied in F215, the broadcast content information obtaining section 15 continues to receive the broadcast content data that is being received at present (step 213), and continue to start the stores operation for storing the received broadcast content data in the broadcast content data information the storage section 53.

In the third embodiment, when the PID and the FID identified before the handoff are registered in the handoff destination wireless base station. The broadcast content data receive operation is continued according to the situation. Alternatively, when the received broadcast content data is different from the one that has been received before the handoff, the same content data as that before the handoff is received by, for example, by newly sending a broadcast request. Furthermore, when the content data the same as that before the handoff cannot be received, a message indicating the unavailability of the content data is displayed. As a result, it is possible to execute an appropriate operation for the broadcast data for the handoff destination base station.

It should be noted that the above-described first to third embodiments have been described by using examples in which content data is broadcasted to all wireless communication terminals within a communication area of a wireless base station by means of broadcast service. Cases in which a multicast service in which content data is broadcasted to only certain wireless communication terminals within a communication area of a wireless base station can be realized using operations similar to the above-described operations.

It should be noted that the wireless communication terminal according to the present invention may be a mobile telephone terminal employing mobile communication, a personal digital assistant (PDA), a mobile terminal, a car-navigation apparatus, or the like, equipped with a mobile communication feature.

It should be noted that programs for implementing the processing section shown in FIG. 1 may be stored on a computer-readable storage medium, and the programs may be loaded to and executed by a computer for executing operations of the broadcast service and the multicast service. As used herein, the term "computer system" is not limited to a computer, but includes an operating system and hardware, such as a neighbor device. In addition, the term "computer-readable storage medium" refers to storage, such as a removable medium (e.g., a flexible disk, a magneto-optical disk, ROM, a CD-ROM), or a storage device, such as a hard disk, which is installed into a computer system. Furthermore, the term "computer-readable storage medium" includes a medium which stores programs for a certain period of time, such as volatile memory in a computer system which is capable of being a server or a client when a program is transmitted via a communication line, e.g., a network, such as the Internet, or a telephone line.

Furthermore, the above-described programs may be transmitted from a computer system in which the programs are stored in a storage device or the like to another computer system via a transmission medium or carrier waves in a transmission medium. The term "transmission medium" on which the programs are transmitted is a medium that is capable of transmitting information, e.g., a network (communication network), such as the Internet, or a communication channel (communication line), such as a telephone line, or the like. In addition, the program described above may execute only a part of the processes described above. Furthermore, the program may be executed in combination with another program that has been stored in a computer system. Such a program is generally referred to as a difference file (difference program).

While preferred embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A wireless communication terminal, comprising:
a requesting section that is configured to request from a base station communicating with the wireless communication terminal before a handoff, a content of a broadcast/multicast service;
a storage section that is configured to store an identifier of the content of the broadcast/multicast service requested by the requesting section;
a handoff detection section for detecting the handoff; and
a control section that is configured to request the content from a handoff destination base station when the handoff is performed, wherein
the content requested by the control section is based on the identifier of the content stored in the storage section,
the control section is configured to receive the content from the handoff destination base station,
the identifier of the content of the broadcast/multicast service is different from a broadcast/multicast service flow,
the storage section is configured to store content identification information on the content obtained from a pre-handoff base station and requested by the requesting section,
the control section is configured to request the content to the handoff destination base station according to the content identification information that is stored in the storage section when the handoff is performed, and
the control section, when the content identification information is not available in the handoff destination base station after requesting the content to the handoff destination base station according to the content identification information that is stored in the storage section, is configured to obtain the content identification information corresponding to the information on the content stored in the storage section from the handoff destination base station and to request the content according to the obtained content identification information.

2. The wireless communication terminal according to claim 1, wherein the control section is configured to obtain content identification information corresponding to the information on the content stored in the storage section from the handoff destination base station and request the content according to the obtained content identification information.

\* \* \* \* \*